United States Patent
Lu

(10) Patent No.: US 10,048,529 B2
(45) Date of Patent: Aug. 14, 2018

(54) COLOR FILTER SUBSTRATE AND LIQUID CRYSTAL DISPLAY DEVICE

(71) Applicant: BOE TECHNOLOGY GROUP CO., LTD., Beijing (CN)

(72) Inventor: Jiaoming Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 459 days.

(21) Appl. No.: 14/426,026

(22) PCT Filed: Apr. 25, 2014

(86) PCT No.: PCT/CN2014/076247
§ 371 (c)(1),
(2) Date: Mar. 4, 2015

(87) PCT Pub. No.: WO2015/085700
PCT Pub. Date: Jun. 18, 2015

(65) Prior Publication Data
US 2016/0033812 A1    Feb. 4, 2016

(30) Foreign Application Priority Data

Dec. 9, 2013  (CN) .......................... 2013 1 0661139

(51) Int. Cl.
*G02F 1/1337* (2006.01)
*G02F 1/1343* (2006.01)
(Continued)

(52) U.S. Cl.
CPC ....... *G02F 1/133514* (2013.01); *G02B 5/201* (2013.01); *G02F 1/13439* (2013.01);
(Continued)

(58) Field of Classification Search
CPC ............... G02F 1/133707; G02F 2001/134381
See application file for complete search history.

(56) References Cited

U.S. PATENT DOCUMENTS 8,130,344 B2 *   3/2012   Tsuchiya ........... G02F 1/133514
                                                    349/107
2003/0025857 A1   2/2003   Ochiai et al.
(Continued)

FOREIGN PATENT DOCUMENTS

CN    1588190 A    3/2005
CN    1755472 A    4/2006
(Continued)

OTHER PUBLICATIONS

First Office Action dated Sep. 24, 2015 corresponding to Chinese application No. 201310661139.6.
(Continued)

*Primary Examiner* — Nathanael R Briggs
*Assistant Examiner* — Alexander Gross
(74) *Attorney, Agent, or Firm* — Nath, Goldberg & Meyer; Joshua B. Goldberg

(57) ABSTRACT

The present invention provides a color filter substrate and a liquid crystal display device, belongs to the field of liquid crystal display technology, and can overcome the color shift problems in existing liquid crystal display device. The color filter substrate of the present invention comprises: a first substrate, a black matrix and a color film layer provided on the first substrate, wherein the color film layer comprises a plurality of pixel units arranged periodically and repeatedly in a matrix, each pixel unit includes at least two sub-pixels of different colors, each sub-pixel comprises a color filter film, a first common electrode disposed on the color filter film, and a dielectric layer disposed on the first common electrode, wherein the thicknesses of the dielectric layer at at least two locations within each pixel unit are different.

10 Claims, 5 Drawing Sheets

(51) Int. Cl.
*G02F 1/1335* (2006.01)
*G02F 1/1333* (2006.01)
*G02B 5/20* (2006.01)

(52) U.S. Cl.
CPC .. *G02F 1/133345* (2013.01); *G02F 1/133371* (2013.01); *G02F 1/133512* (2013.01); *G02F 1/133707* (2013.01); *G02F 2001/133357* (2013.01); *G02F 2001/133776* (2013.01); *G02F 2001/134381* (2013.01)

(56) References Cited

U.S. PATENT DOCUMENTS

| | | | |
|---|---|---|---|
| 2006/0023151 A1* | 2/2006 | Lee | G02F 1/133707 349/141 |
| 2006/0061716 A1 | 3/2006 | Yamaguchi et al. | |
| 2007/0279566 A1 | 12/2007 | Huang | |
| 2009/0091587 A1* | 4/2009 | Kim | G02F 1/134363 345/690 |
| 2010/0073606 A1* | 3/2010 | Nishihara | G02F 1/133707 349/96 |
| 2012/0099060 A1* | 4/2012 | Matsumoto | G02F 1/133371 349/106 |
| 2013/0235311 A1* | 9/2013 | Onaka | G02B 5/201 349/108 |
| 2013/0286312 A1 | 10/2013 | Choi et al. | |

FOREIGN PATENT DOCUMENTS

| | | |
|---|---|---|
| CN | 101075045 A | 11/2007 |
| CN | 101673007 A | 3/2010 |
| CN | 102466933 A | 5/2012 |
| CN | 202330949 U | 7/2012 |
| CN | 102654672 A | 9/2012 |
| CN | 103676297 A | 3/2014 |

OTHER PUBLICATIONS

Written Opinion of the International Searching Authority dated Apr. 25, 2014 corresponding to International application No. PCT/CN2014/076247.
International Search Report dated Apr. 25, 2014 corresponding to application No. PCT/CN2014/076247.

* cited by examiner 103  104

103  104

COLOR FILTER SUBSTRATE AND LIQUID CRYSTAL DISPLAY DEVICE

FIELD OF THE INVENTION

The present invention belongs to the field of liquid crystal display technology, in particular to a color filter substrate and a liquid crystal display device.

BACKGROUND OF THE INVENTION

TFT-LCD (thin film transistor liquid crystal display) is an important flat panel display device. Depending on the direction of the electric field driving the liquid crystal, TFT-LCD can be classified into a vertical electric field type and a horizontal electric field type. The vertical electric field type TFT-LCD requires pixel electrodes formed on an array substrate, and common electrodes formed on a substrate to be aligned and assembled with the array substrate (e.g. a color filter substrate), as in the commonly used TN mode; the horizontal electric field type TFT-LCD requires pixel electrodes and common electrodes respectively formed on the array substrate, as in the ADS mode (advanced ultra-dimensional field switching mode) or in the IPS mode.

As shown in FIG. 1, a new type of TFT-LCD is currently developed on the basis of the conventional horizontal electric field type TFT-LCD, the new TFT-LCD comprising a strip-shaped pixel electrode 103 and a strip-shaped second common electrode 104 formed on an array substrate 102 as well as a plate-shaped first common electrode 105 formed on a color filter substrate 101. In the conventional horizontal electric field type TFT-LCD, a phenomenon of liquid crystal phase error would occur in the liquid crystal molecules due to the electric field formed between the strip-shaped pixel electrode and the strip-shaped second common electrode on the array substrate, i.e. a black line (caused by the liquid crystal phase error) appears between the strip-shaped pixel electrode 103 and the strip-shaped second common electrode 104 as shown in FIG. 3, while in the structure of the TFT-LCD shown in FIG. 1, the plate-shaped first common electrode 105 is formed on the color filter substrate 101, therefore the phenomenon of the liquid crystal phase error can be avoided. The array substrate 102 in the above mentioned TFT-LCD is similar to the IPS mode, the solution is also possible if the array substrate 102 is implemented in the ADS mode wherein the second common electrode is a plate-shaped electrode and the pixel electrode is a stripe-shaped electrode; or the pixel electrode is a plate-shaped electrode and the second common electrode is a strip-shaped electrode.

As shown in FIG. 2, on the basis of the TFT-LCD having the structure as shown in FIG. 1, a dielectric layer (over coater) 106 is formed on the first common electrode 105 of the color filter substrate 101, wherein the dielectric layer 106 is typically made of insulating material such as acrylic resin. By comparing the distribution diagram of the electric field equipotential lines as shown in FIG. 1 and FIG. 2, it can be seen in the structure of the TFT-LCD of FIG. 2 that, lateral equipotential lines are substantially distributed in the dielectric layer 106, and the amount of vertical equipotential lines distributed in the liquid crystal layer is also increased, thus the TFT-LCD having the structure shown in FIG. 2 may facilitate transition of the liquid crystal molecules from an upright state to an inclined state, thereby improving the transmittance of the TFT-LCD having the structure shown in FIG. 2. In addition, comparing the display screens shown in FIGS. 3 and 4, it can be seen that the brightness of the TFT-LCD having the structure shown in FIG. 2 is increased as compared to the conventional horizontal electric field type TFT-LCD.

Brightness of a liquid crystal display device is related to the angle between the liquid crystal molecule and light. When a liquid crystal molecule has a certain orientation, the brightness of a same location on the liquid crystal display device as observed from different positions outside the liquid crystal display device is different, this is because the light output angles from a same location on the liquid crystal display device as observed from different positions outside the liquid crystal display device are different, so that the angles between the liquid crystal molecules and light are different. For this reason, if the liquid crystal molecules within a pixel unit have a single orientation or the difference among the orientation is rather small, the brightness of the pixel unit observed from different positions outside the liquid crystal display device is different, that is, a phenomenon of color shift occurs. Although the liquid crystal molecules in the liquid crystal display device have different deflection directions under the influence of electric field, the liquid crystal molecule have few orientations, so that color shift occurs.

SUMMARY OF THE INVENTION

In order to solve the above problems in the existing liquid crystal display device, the present invention provides a color filter substrate and a liquid crystal display device which can improve the transmittance and further overcome the color shift problem.

To solve the above problem, the present invention provides a color filter substrate comprising: a first substrate, a black matrix and a color film layer provided on the first substrate, wherein the color film layer comprises a plurality of pixel units arranged periodically and repeatedly in a matrix, each pixel unit includes at least two sub-pixels of different colors, each sub-pixel comprises a color filter film, a first common electrode disposed on the color filter film, and a dielectric layer disposed on the first common electrode, wherein the thicknesses of the dielectric layer at at least two locations within each pixel unit are different.

Preferably, in at least one sub-pixel of each pixel unit, the thicknesses of the dielectric layer at at least two locations are different.

Preferably, in each sub-pixel of each pixel unit, the thicknesses of the dielectric layer at at least two locations are different.

Preferably, in each sub-pixel of each pixel unit, the dielectric layer has a first thickness at a peripheral area surrounding a central area, and has a second thickness at the central area, the first thickness is larger than the second thickness.

Preferably, in each sub-pixel of each pixel unit, the dielectric layer is symmetry with respect to a central axis of the sub-pixel.

Preferably, in at least one sub-pixel of each pixel unit, the thickness of the dielectric layer changes gradually along a first direction.

Preferably, in at least one sub-pixel of each pixel unit, an angle between a surface of the dielectric layer away from the first common electrode and the plane where the first substrate is located is α, and α ranges from 5 to 10 degrees.

Further preferably, the pixel unit includes a red sub-pixel, a green sub-pixel and a blue sub-pixel, and at the red sub pixel, the angle between a surface of the dielectric layer away from the first common electrode and the plane where the first substrate is located is αR; at the green sub pixel, the angle between a surface of the dielectric layer away from the first common electrode and the plane where the first substrate is located is αG; at the blue sub pixel, the angle between a surface of the dielectric layer away from the first common electrode and the plane where the first substrate is located is αB, wherein αR=αG=αB.

Further preferably, the maximum thickness of the dielectric layer at the red sub-pixel is dR, the maximum thickness of the dielectric layer at the green sub-pixel is dG, and the maximum thickness of the dielectric layer at the blue sub-pixel is dB, wherein dR>dG>dB.

Alternatively, the maximum thickness of the dielectric layer at the red sub-pixel is dR, the maximum thickness of the dielectric layer at the green sub-pixel is dG, and the maximum thickness of the dielectric layer at the blue sub-pixel is dB, wherein dR=dG=dB.

Further preferably, the pixel unit includes a red sub-pixel, a green sub-pixel and a blue sub-pixel, and at the red sub pixel, the angle between a surface of the dielectric layer away from the common electrode and the plane where the first substrate is located is αR; at the green sub pixel, the angle between a surface of the dielectric layer away from the common electrode and the plane where the first substrate is located is αG; at the blue sub pixel, the angle between a surface of the dielectric layer away from the common electrode and the plane where the first substrate is located is αB, wherein αR>αG>αB.

Preferably, the dielectric constant of the dielectric layer ranges from 2 to 5.

Preferably, the material of the dielectric layer is acrylic resin.

Preferably, the thickness of the dielectric layer ranges from 1.5 to 6.5 μm.

To solve the above problem, the present invention provides a liquid crystal display device comprising an array substrate and the color filter substrate described above.

Preferably, the array substrate comprises a second substrate, pixel electrodes and second common electrodes;

the pixel electrodes and the second common electrodes are strip-shaped electrodes disposed with intervals on the second substrate.

Preferably, the array substrate comprises a second substrate, pixel electrodes, second common electrodes and an insulation layer;

the pixel electrodes are plate-shaped electrodes disposed on the second substrate;

the second common electrodes are strip-shaped electrodes disposed above the pixel electrodes, and are separated from the pixel electrodes by a planarization layer.

Preferably, the array substrate comprises a second substrate, pixel electrodes, second common electrodes and an insulation layer;

the second common electrodes are a plate-shaped electrodes disposed on the second substrate;

the pixel electrodes are strip-shaped electrodes disposed above the second common electrodes, and are separated from the second common electrode by a planarization layer.

In the color filter substrate of the present invention, the thicknesses of the dielectric layer at at least two locations within each pixel unit are different, thus in a liquid crystal display device formed by the color filter substrate and the array substrate which are aligned and assembled, the distributions of the equipotential lines between the pixel electrodes on the array substrate corresponding to the locations of different thicknesses of the dielectric layer and the second common electrode are different, so that the deflection directions of liquid crystal molecules in the liquid crystal display device are dispersed, the brightness of a same location on the liquid crystal display device when observed from different angles is substantially the same, thereby reducing the color shift. Further, the more dispersed the deflection direction of liquid crystal molecules are, the further the color shift can be reduced.

DETAILED DESCRIPTION OF THE EMBODIMENTS

Figure 1:
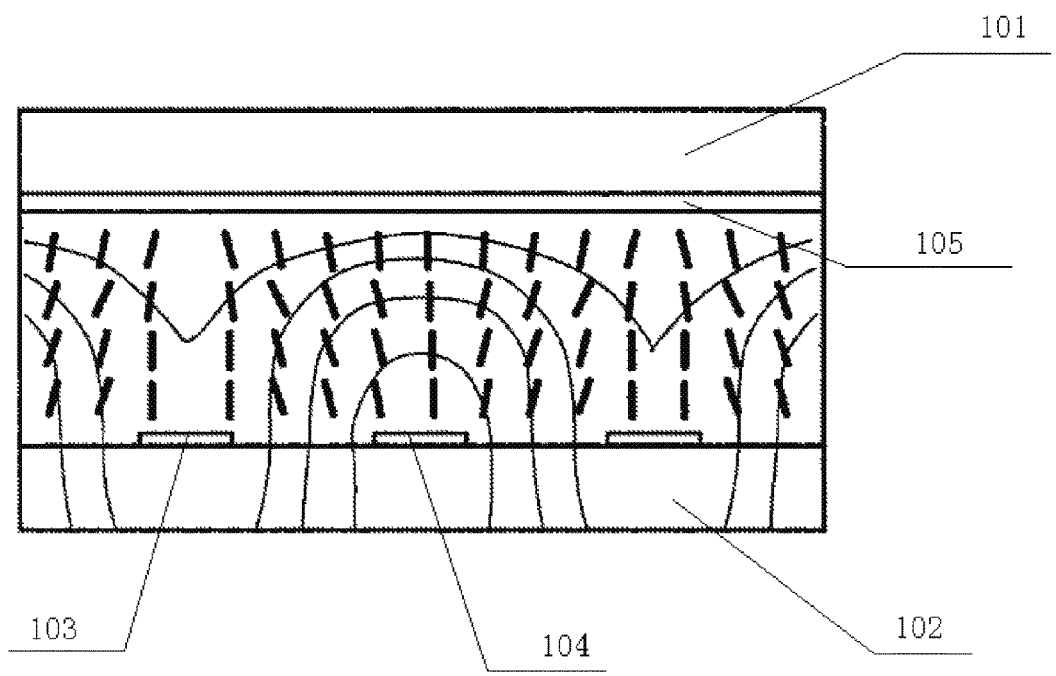
FIG. 1 is a schematic view of a liquid crystal display device formed by disposing a plate-shaped common electrode on a color filter substrate of conventional IPS mode horizontal electric field type liquid crystal display device.
Figure 2:
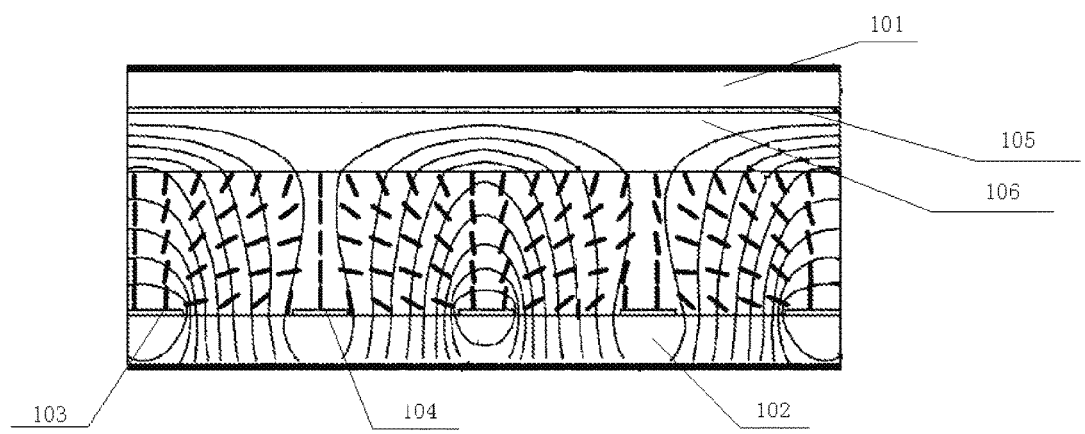
FIG. 2 is a schematic view of a liquid crystal display device formed by disposing a dielectric layer on the plate-shaped common electrode of the color filter substrate in the liquid crystal display device shown in FIG. 1.
Figure 3:
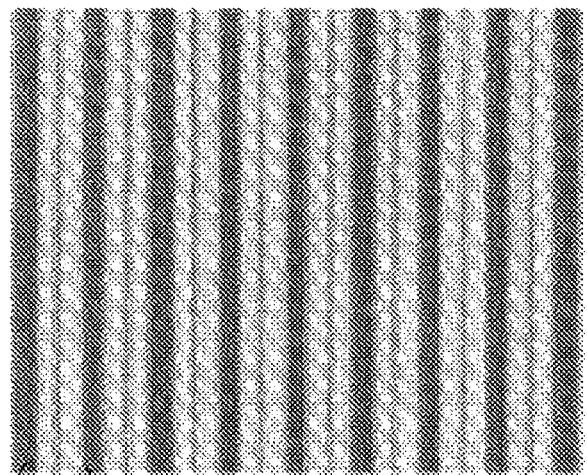
FIG. 3 is a schematic view of a display screen of an existing conventional IPS horizontal electric field type liquid crystal display device.
Figure 4:
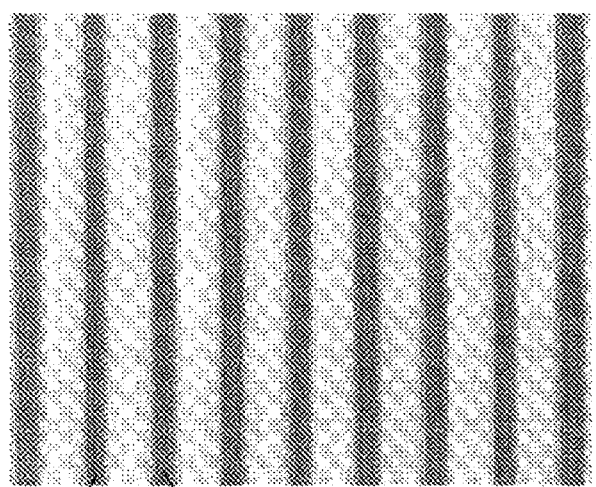
FIG. 4 is a schematic view of a display screen of the liquid crystal display device shown in FIG. 2.

In order to make those skilled in the art better understand the technical solution of the invention, the present invention is further described below in details in conjunction with the accompanying drawings and specific embodiments.

The present invention provides a color filter substrate comprising: a first substrate, a black matrix and a color film layer provided on the first substrate, wherein the color film layer comprises a plurality of pixel units arranged periodically and repeatedly in a matrix, each pixel unit includes at least two sub-pixels of different colors, each sub-pixel comprises a color filter film, a first common electrode disposed on the color filter film, and a dielectric layer disposed on the first common electrode, wherein the thicknesses of the dielectric layer at at least two locations within each pixel unit are different. The color filter substrate is aligned and assembled with an array substrate to form a liquid crystal display device as shown in FIGS. 5 through 9.

In the above-described liquid crystal display device, the thicknesses of the dielectric layer at at least two locations within each pixel unit are different, thus the distributions of the equipotential lines between the pixel electrodes on the array substrate corresponding to locations of different thicknesses of the dielectric layer and the second common electrode are different, so that the deflection directions of liquid crystal molecules in the liquid crystal display device are dispersed, and the brightness of a same location on the liquid crystal display device when observed from different angles is substantially the same, thereby reducing the color shift. Further, the more dispersed the deflection directions of liquid crystal molecules are, the further the color shift can be reduced.

Preferably, the dielectric constant of the dielectric layer ranges from 2 to 5; the material of the dielectric layer is acrylic resin; of course other dielectric material is also possible. Preferably, the thickness of the dielectric layer ranges from 1.5 to 6.5 μm, such thickness makes the transmittance of the liquid crystal display device as larger as possible, thereby improving the display effect of the liquid crystal display device. Of course, the thickness of the dielectric layer may not be limited in the range of 1.5 to 6.5 μm, those skilled in the art can set a value depending on specific conditions.

Preferably, the array substrate comprises a second substrate, pixel electrodes and second common electrodes; the pixel electrodes and the second common electrodes are strip-shaped electrodes disposed with intervals on the second substrate. In this case, the electric field generated by the pixel electrodes and the second common electrodes arranged on the second substrate is the IPS horizontal electric field. Also preferably, the pixel electrodes are plate-shaped electrodes disposed on the second substrate; the second common electrodes are strip-shaped electrodes disposed above the pixel electrodes, and are separated from the pixel electrodes by a planarization layer. Further preferably, the second common electrodes are plate-shaped electrodes disposed on the second substrate; the pixel electrodes are strip-shaped electrodes disposed above the second common electrodes, and are separated from the second common electrodes by a planarization layer. In this case, the electric field generated by the pixel electrodes and the second common electrodes arranged on the second substrate is the ADS horizontal electric field.

Details will be described in the following embodiments for better understanding of the present invention.

First Embodiment

As shown in FIGS. 5 through 9, the present invention provides a color filter substrate 101 comprising: a first substrate (not shown), a black matrix (not shown) and a color film layer (not shown) provided on the first substrate, wherein the color film layer comprises a plurality of pixel units arranged periodically and repeatedly in a matrix, each pixel unit includes at least two sub-pixels of different colors, each sub-pixel comprises a color filter film (not shown in the figure, the color of the color filter film is the same as the sub-pixel), a first common electrode 105 disposed on the color filter film, and a dielectric layer 106 disposed on the first common electrode 105. The color filter substrate 101 is aligned and assembled with an array substrate 102 to form a liquid crystal display device.

The thicknesses of the dielectric layer 106 at at least two locations within each pixel unit are different. Furthermore, in at least one sub-pixel of each pixel unit, the thicknesses of the dielectric layer 106 at at least two locations are different. Specifically, in an example of the present embodiment, each pixel unit includes sub-pixels of three different colors, i.e. red, green and blue, the thicknesses of the dielectric layer 106 at the sub-pixels of at least one color of each pixel unit are different. In this case, the distributions of the equipotential lines between the pixel electrodes 103 on the array substrate 102 corresponding to the locations of different thicknesses of the dielectric layer 106 and the second common electrode 104 are different, so that the deflection directions of liquid crystal molecules in the liquid crystal display device are dispersed, and the brightness of a same location on the liquid crystal display device when observed from different angles is substantially the same, thereby reducing the color shift. If the dielectric layer 106 has more locations having different thicknesses, the deflection directions of liquid crystal molecules will be further dispersed, and the color shift can be further reduced.

Figure 5:
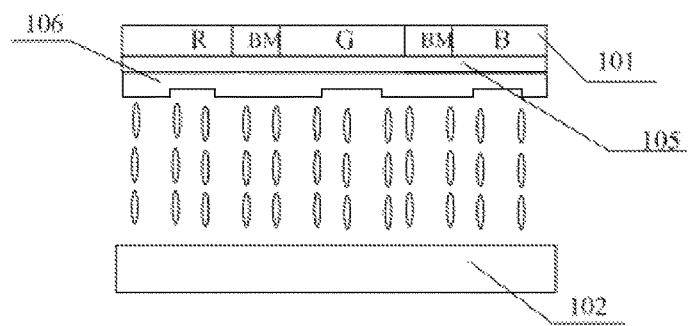
FIG. 5 is a schematic view of an example of the liquid crystal display device according to the first embodiment of the present invention.

As shown in FIG. 5, as one case of the present embodiment, preferably, in each sub-pixel of each pixel unit, the thicknesses of the dielectric layer 106 at at least two locations are different. Further preferably, in each sub-pixel of each pixel unit, the dielectric layer 106 has two different thicknesses, wherein a peripheral area surrounding a central area of the dielectric layer 106 has a first thickness, the central area of the dielectric layer 106 has a second thickness, and the first thickness is larger than the second thickness.

Preferably, in each sub-pixel of each pixel unit, the dielectric layer 106 is symmetry with respect to a central axis of the sub-pixel (parallel to the first substrate). In this case, the view angle of the liquid crystal display device can be made symmetry, and the display effect of the liquid crystal display device would be better. Meanwhile, the dielectric layer 106 has different thicknesses, so that the color shift can be reduced.

Figure 6:
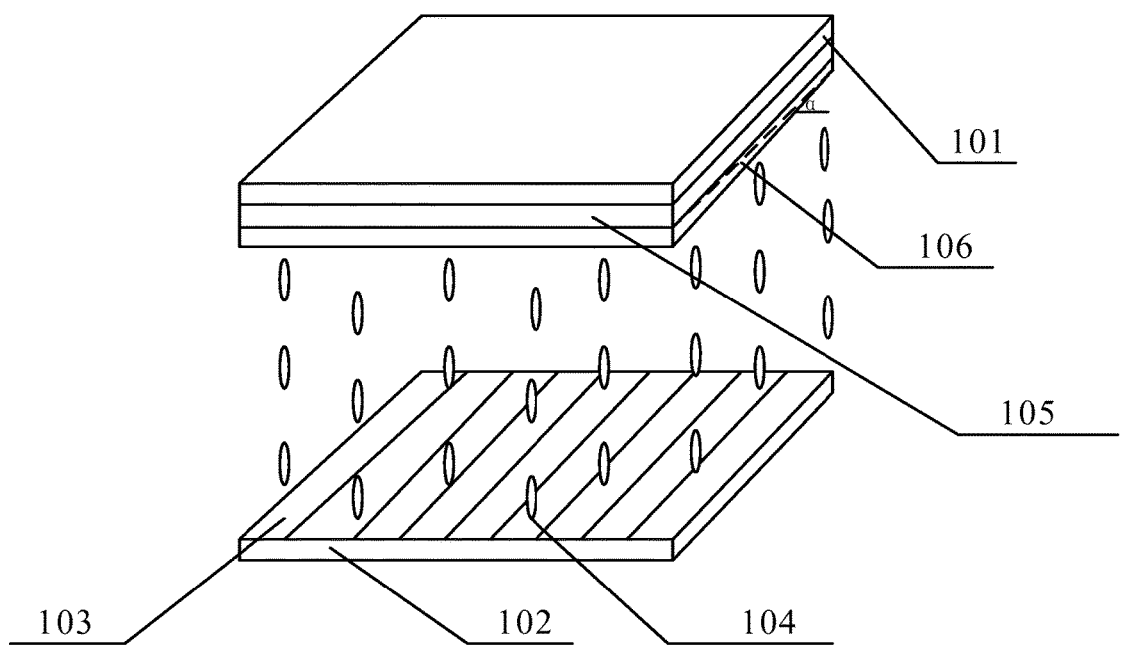
FIGS. 6, 7, 8, 9 are schematic views of other examples of the liquid crystal display device according to the first embodiment of the present invention.

As shown in FIG. 6, as another case of the present embodiment, preferably, in at least one sub-pixel of each pixel unit, the thickness of the dielectric layer 106 changes gradually along a first direction. It should be noted that, here the first direction may be the direction where the gate lines are arranged, or may be the direction where the data lines are arranged. Further preferably, the angle between a surface of the dielectric layer 106 away from the first common electrode 105 and the plane where the first substrate is located is α, and α ranges from 5 to 10 degrees.

Specifically, take the configuration where each pixel unit includes sub-pixels of three different colors red, green and blue, and the thickness of the dielectric layer at the sub-pixel of each color changes gradually along the first direction as an example, wherein at the red sub pixel, the angle between a surface of the dielectric layer 106 away from the first common electrode 105 and the plane where the first substrate is located is αR, at the green sub pixel, the angle between a surface of the dielectric layer 106 away from the first common electrode 105 and the plane where the first substrate is located is αG, and at the blue sub pixel, the angle between a surface of the dielectric layer 106 away from the first common electrode 105 and the plane where the first substrate is located is αB, each of αR, αG, αB ranges from 5 to 10 degrees. That is, the dielectric layer 106 disposed on the color filter films of red, green, blue sub-pixels has a structure in which the thickness is gradually increasing. In this case, the distributions of the equipotential lines between the pixel electrodes 103 on the array substrate 102 corresponding to the locations of different thicknesses of the dielectric layer 106 in the same color sub-pixel and the second common electrode 104 are different, so that the deflection directions of liquid crystal molecules in the liquid crystal display device are dispersed, and the brightness of a same location on the liquid crystal display device when observed from different angles is substantially the same, thereby reducing the color shift.

Figure 7:
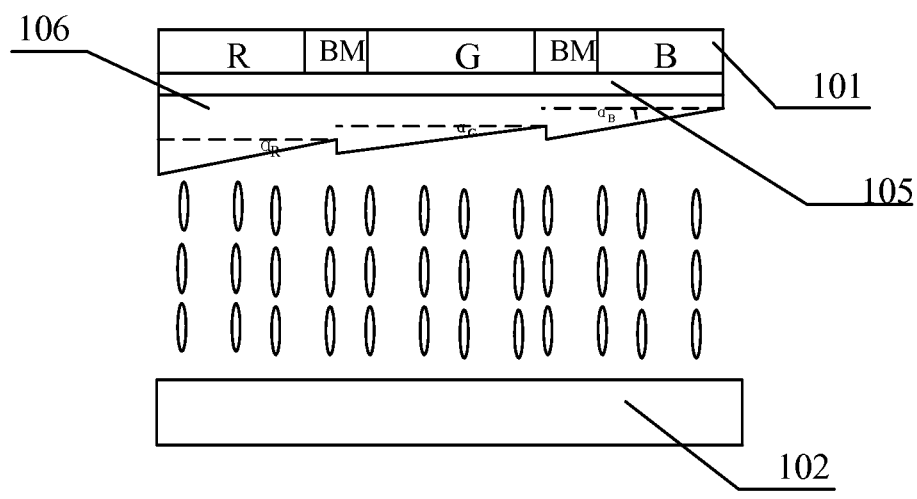
Figure 8:
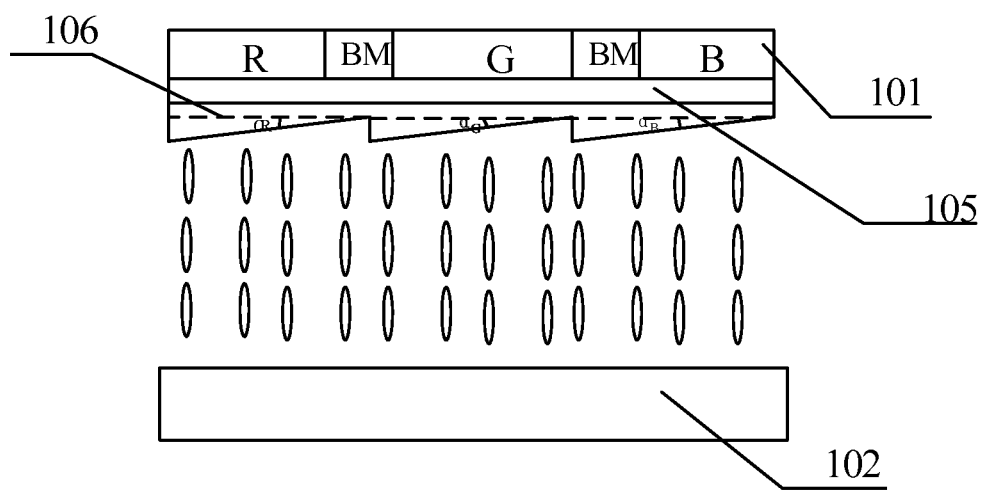

As shown in FIGS. 7 and 8, when αR=αG=αB, there are two different cases as follows.

As shown in FIG. 7, preferably, the maximum thickness of the dielectric layer 106 at the red sub-pixel is dR, the maximum thickness of the dielectric layer 106 at the blue sub-pixel is dG, and the maximum thickness of the dielectric layer 106 at the green sub-pixel is dB, wherein dR>dG>dB. It should be noted that the transmittances (Tr) of the sub-pixels of different colors are relevant to the thicknesses (d) of the dielectric layer 106 and the transmittances of the color filter films of the sub-pixels of different colors. The transmittances of the color filter films of the sub-pixels of three different colors red, green and blue are respectively TrR, TrG, TrB, while the values of TrR, TrG, TrB are relevant to the color of corresponding color filter films, the transmittances of the color filter films of different colors are different. In order to achieve a maximum transmittance of the liquid crystal display device, the transmittance of the sub-pixels of each color in each pixel unit should reach a maximum value, but the transmittance of the color filter film of the sub-pixel of each color is constant, therefore it is required that the dielectric layer 106 at the sub-pixel of each color has different thicknesses. It will be appreciated to those skilled in the art that when the thickness of the dielectric layer 106 is 1.4 µm, the transmittance of a corresponding blue sub-pixel reaches a maximum value at a wavelength of 450 nm, and the blue light has highest transmittance at the wavelength of about 450 nm; accordingly, when the thickness of the dielectric layer 106 is 2.1 µm, the transmittance of a corresponding green sub-pixel reaches a maximum value at a wavelength of 550 nm, and the green light has highest transmittance at the wavelength of about 550 nm; accordingly, when the thickness of the dielectric layer 106 is 3.1 µm, the transmittance of a corresponding red sub-pixel reaches a maximum value at a wavelength of 650 nm, and the red light has highest transmittance at the wavelength of about 650 nm. As such, the maximum thickness of the dielectric layer 106 at the blue sub-pixel can be set to 1.4 µm, such that the ratio of the blue light transmitted through the liquid crystal layer corresponding to the blue sub-pixel becomes a maximum value, and accordingly more light can be transmitted through the blue color filter film; the maximum thickness of the dielectric layer 106 at the green sub-pixel can be set to 2.1 µm, such that the ratio of the green light transmitted through the liquid crystal layer corresponding to the green sub-pixel becomes a maximum value, and accordingly more light can be transmitted through the green color filter film; the maximum thickness of the dielectric layer 106 at the red sub-pixel can be set to 3.1 µm, such that the ratio of the red light transmitted through the liquid crystal layer corresponding to the red sub-pixel becomes a maximum value, and accordingly more light can be transmitted through the red color filter film. By adjusting the maximum thicknesses of the dielectric layer 106 at the red, green, and blue sub-pixels, the transmittance (Tr) of the entire liquid crystal display can reach a maximum value, such that the brightness of the liquid crystal display device can be improved and the power consumption of the liquid crystal display device can be reduced. Since the maximum thicknesses of the dielectric layer 106 at sub-pixels of different colors are different, the liquid crystal molecules in various angles can be observed from a certain angle outside the liquid crystal display device, thereby the color shift can be reduced.

In the present embodiment, as an example, each pixel unit of the color filter substrate 101 includes the sub-pixels of three colors, i.e. red, green and blue, of course each pixel unit of the color filter substrate 101 may include sub-pixels of other colors. In this case, by adjusting the maximum thicknesses of the dielectric layer 106 at the sub-pixels of different colors, the transmittance of the liquid crystal display device can reach a maximum value, and since the maximum thicknesses of the dielectric layer 106 at sub-pixels of different colors are different, the color shift can be further reduced.

As shown in FIG. 8, it can also be set as dR=dG=dB, as long as at least parts of the dielectric layer 106 at sub-pixels of different colors have different thicknesses. In this case, the color shift can also be reduced.

Figure 9:
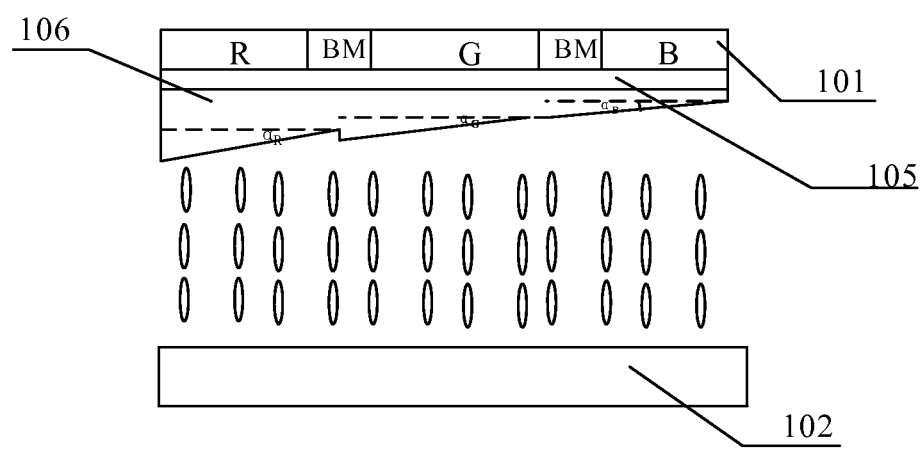

As shown in FIG. 9, when $\alpha R > \alpha G > \alpha B$, the dielectric layer 106 at the red sub-pixel has a largest inclination, the dielectric layer 106 at the green sub-pixel has a second largest inclination, and the dielectric layer 106 at the blue sub-pixel has a smallest inclination. In this case, the liquid crystal molecules corresponding to the red sub-pixel have the most dispersed deflection directions, the liquid crystal molecules corresponding to the green sub-pixel have lowered dispersion of the deflection directions, and the liquid crystal molecules corresponding to the blue sub-pixel have further lowered dispersion of the deflection directions, thus the color shift can be reduced effectively and the display effect of the liquid crystal display device can be improved.

Note that the dielectric layer 106 of different thicknesses can be fabricated through conventional exposure process by using gray scale mask plate or halftone mask plate or the like.

It should be understood that above embodiments are only exemplary embodiments for illustrating the principle of the present invention; however, the present invention is not limited thereto. Various variations and improvements can be made by persons skilled in the art without departing from the spirit and essence of the present invention, and these variations and improvements should also be considered to be within the protection scope of the present invention.

The invention claimed is:

1. A color filter substrate, comprising: a first substrate, a black matrix and a color film layer provided on the first substrate, wherein
    the color film layer comprises a plurality of pixel units arranged periodically and repeatedly in a matrix, each pixel unit includes a red sub-pixel, a green sub-pixel and a blue sub-pixel, each sub-pixel comprises a color filter film, a first common electrode disposed on the color filter film, and a dielectric layer disposed on the first common electrode, wherein the thicknesses of the dielectric layer at at least two locations within each pixel unit are different, and wherein the thickness of the dielectric layer decreases along a first direction in at least one sub-pixel of each pixel unit, and wherein
    an angle between a surface of the dielectric layer away from the first common electrode and the plane where the first substrate is located is $\alpha$ in at least one sub-pixel of each pixel unit, and $\alpha$ ranges from 5 to 10 degrees;
    the angle between a surface of the dielectric layer away from the first common electrode and the plane where the first substrate is located is $\alpha R$ at the red sub pixel, the angle between a surface of the dielectric layer away from the first common electrode and the plane where the first substrate is located is $\alpha G$ at the green sub pixel, and the angle between a surface of the dielectric layer away from the first common electrode and the plane where the first substrate is located is $\alpha B$ at the blue sub pixel, wherein $\alpha R = \alpha G = \alpha B$; and
    the maximum thickness of the dielectric layer at the red sub-pixel is dR, the maximum thickness of the dielectric layer at the green sub-pixel is dG, and the maximum thickness of the dielectric layer at the blue sub-pixel is dB, wherein dR>dG>dB.

2. The color filter substrate according to claim 1, wherein the dielectric layer has a first thickness at a peripheral area surrounding a central area and has a second thickness at the central area in each sub-pixel of each pixel unit, the first thickness is larger than the second thickness.

3. The color filter substrate according to claim 1, wherein the dielectric constant of the dielectric layer ranges from 2 to 5.

4. The color filter substrate according to claim 1, wherein the material of the dielectric layer is acrylic resin.

5. The color filter substrate according to claim 1, wherein the thickness of the dielectric layer ranges from 1.5 to 6.5 µm.

6. A liquid crystal display device, comprising an array substrate and a color filter substrate, the color filter substrate comprising: a first substrate, a black matrix and a color film layer provided on the first substrate, wherein the color film layer comprises a plurality of pixel units arranged periodically and repeatedly in a matrix, each pixel unit includes a red sub-pixel, a green sub-pixel and a blue sub-pixel, each sub-pixel comprises a color filter film, a first common electrode disposed on the color filter film, and a dielectric layer disposed on the first common electrode, wherein the thicknesses of the dielectric layer at at least two locations within each pixel unit are different, and wherein the thickness of the dielectric layer decreases along a first direction in at least one sub-pixel of each pixel unit, and wherein an angle between a surface of the dielectric layer away from the first common electrode and the plane where the first substrate is located is $\alpha$ in at least one sub-pixel of each pixel unit, and $\alpha$ ranges from 5 to 10 degrees;

the angle between a surface of the dielectric layer away from the first common electrode and the plane where the first substrate is located is $\alpha R$ at the red sub pixel, the angle between a surface of the dielectric layer away from the first common electrode and the plane where the first substrate is located is $\alpha G$ at the green sub pixel, and the angle between a surface of the dielectric layer away from the first common electrode and the plane where the first substrate is located is $\alpha B$ at the blue sub pixel, wherein $\alpha R = \alpha G = \alpha B$; and the maximum thickness of the dielectric layer at the red sub-pixel is dR, the maximum thickness of the dielectric layer at the green sub-pixel is dG, and the maximum thickness of the dielectric layer at the blue sub-pixel is dB, wherein dR>dG>dB.

7. The liquid crystal display device according to claim 6, wherein in the color filter substrate, the dielectric layer has a first thickness at a peripheral area surrounding a central area and has a second thickness at the central area in each sub-pixel of each pixel unit, the first thickness is larger than the second thickness.

8. The liquid crystal display device according to claim 6, wherein the array substrate comprises a second substrate, pixel electrodes and second common electrodes;

the pixel electrodes and the second common electrodes are strip-shaped electrodes disposed with intervals on the second substrate.

9. The liquid crystal display device according to claim 6, wherein the array substrate comprises a second substrate, pixel electrodes, second common electrodes and an insulation layer;

the pixel electrodes are plate-shaped electrodes disposed on the second substrate;

the second common electrodes are strip-shaped electrodes disposed above the pixel electrodes, and are separated from the pixel electrodes by a planarization layer.

10. The liquid crystal display device according to claim 6, wherein the array substrate comprises a second substrate, pixel electrodes, second common electrodes and an insulation layer;

the second common electrodes are plate-shaped electrodes disposed on the second substrate;

the pixel electrodes are strip-shaped electrodes disposed above the second common electrodes, and are separated from the second common electrode by a planarization layer.

* * * * *